Dec. 28, 1954     E. W. DONATH     2,697,933
DEW POINT MEASURING DEVICE
Filed Oct. 13, 1951     2 Sheets-Sheet 1
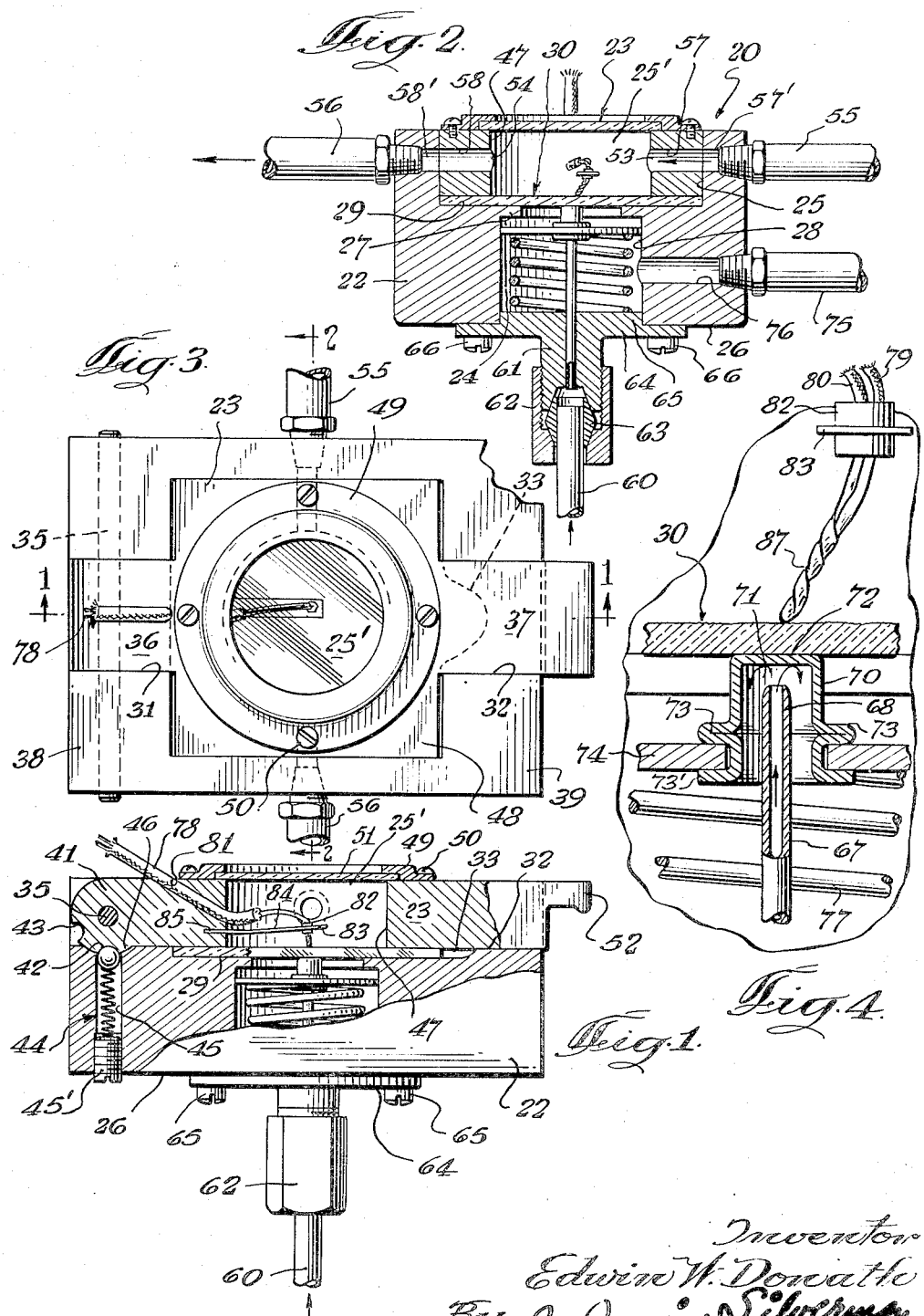
Inventor
Edwin W. Donath
By J. Irving Silverman
Attorney

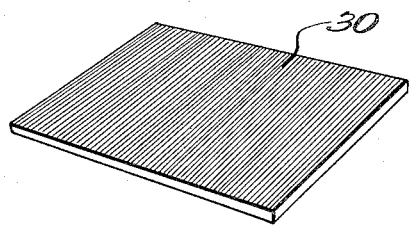
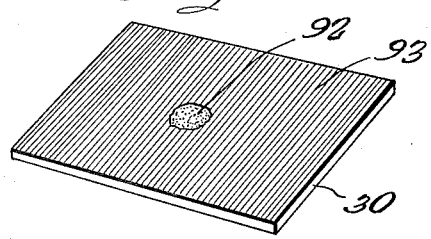
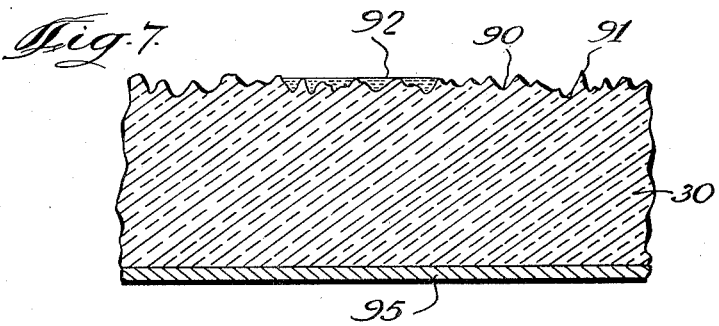
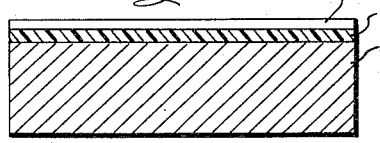
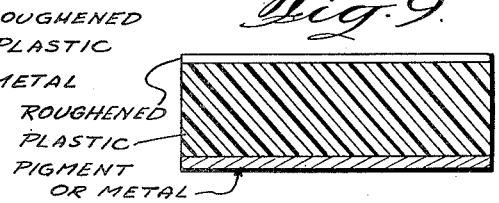
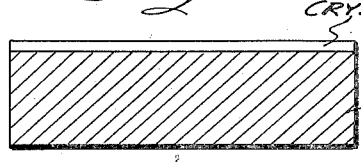
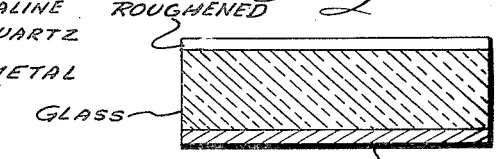
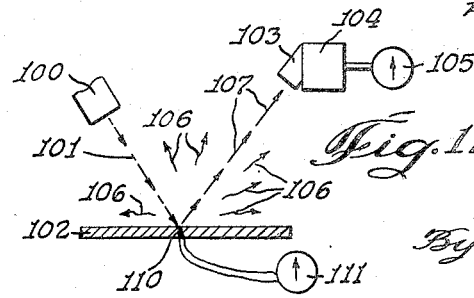

United States Patent Office 2,697,933
Patented Dec. 28, 1954

2,697,933

DEW POINT MEASURING DEVICE

Edwin W. Donath, Chicago, Ill., assignor to Illinois Testing Laboratories, Inc., Chicago, Ill., a corporation of Illinois Application October 13, 1951, Serial No. 251,213

26 Claims. (Cl. 73—17)

This invention is concerned generally with improvements in dew-point measuring devices for determining dew-point and more specifically is concerned with the construction of an improved dew-point measuring device for measuring accurately and precisely the dew-point of a gas utilizing the observer's visual powers for detection of moisture condensate.

The device contemplated by the invention is characterized by its economical construction, its particular adaptability for measuring the dew-point of a sample of gas or of oil vapor and the like, and the ease and rapidity with which the device may be operated for taking successive determinations accurately for the same or different gases.

In many industries, laboratories and the like, it is important to measure accurately the dew-point either of a given gas sample or the atmosphere whereby one is enabled to determine the moisture content of the sample or the atmosphere. One of the most common methods used depends upon the observer perceiving a deposit of condensate upon a mirror, i. e. a highly polished metal surface whose temperature is slowly lowered below the dew-point; or in other words, the method depends upon the creation of a visible deposit of condensate. The amount of condensate required to be seen by the eye, even with optical instruments, is greater than the amount of moisture contained in the first few molecules of condensate formed when the dew-point is reached. Accordingly, it will be appreciated that the closer the coincidence between the instant the condensate is formed and the point in time that same is detected by the observer, the more precise will be the determination of the dew-point.

Heretofore, the practice of condensing the gas sample upon a moisture collector, or "mirror" as it is termed, which has been cooled slowly below the dew-point has resulted in considerable error believed to be due to certain pronounced disadvantages. Firstly, the condensate formed upon the mirror is detectable to the eye more or less as a dew deposited on the mirror. The detection of this dew by a given observer may be delayed beyond the true dew-point of the gas sample by the highly reflective surface of the mirror masking the formation of the first few visible drops of condensate. The masking may be due to the nature of the mirror which reflects the light rays impinging thereon at various angles of reflection so that detection of the frost by the observer is delayed by reason of the close similarity in appearance of the frosted and unfrosted surface of the mirror. This is a matter of technique and skill, and the results obtained will be commensurate with the experience of the observer.

A second disadvantage is believed explainable on the theory of supersaturation. If a mirror in contact with a gas sample is cooled gradually, generally condensation of the gas will take place at a temperature where the saturation point for the sample is reached. However, it has been found that a gas sample cooled without agitation may be cooled considerably below the saturation temperature or dew-point corresponding to its pressure, without any condensation occurring. It is then said to be supersaturated and it is unstable. If a single drop of liquid or any dust or "seed" is introduced into the vapor, condensation will begin immediately and a great quantity of condensate is formed in a short time at a temperature considerably below the true dew-point of the sample. It is believed that this phenomena may result in the immediate area of contact of the gas sample with the mirror as cooling takes place producing the unstable state of supersaturation of the gas sample. When condensation does take place, a droplet large enough to provide a "seed" is formed and thereafter the condensate is precipitated with great rapidity by upsetting the unstable state of supersaturation in the immediate vicinity of the mirror.

Under these circumstances, not only will the dew appear at a temperature below the true dew-point, but the condensate is formed so rapidly from a super-saturated condition that the exact instant of formation, even at the apparent dew-point, is difficult of determination.

I have found that by utilizing a dew-point measuring device of the character described, the dew-point of a gas sample is determined with greater accuracy than possible with heretofore known devices based on the principle of visual detection of a condensate formed on a mirror or moisture collector. Accordingly, it is a principal object of the invention to provide a greatly improved device for measuring dew-point by visual detection of a condensate formed on a mirror.

Another important object of the invention is to provide a novel and unique moisture collector or mirror for dew-point measuring devices which will enable visual detection of the condensate in closer coincidence in point of time with the instant same is formed than heretofore has been possible in devices of this type.

Another object of the invention is to provide a dew-point measuring device having my novel moisture collector which will permit rapid, accurate and successive dew-point determinations; which is simple and inexpensive to make and operate; and which will permit accurate and reliable determinations to be made by relatively unskilled operators.

An ancillary object of the invention is to provide a device of the character described admirably adapted also for determining the vapor pressure of a sample of oil vapor or volatile hydrocarbon.

My invention gives rise to many advantages and desirable results not readily apparent from a perusal of the above objects, among which are the simplicity and minimum amount of skill required in the use of the device; its adaptability to portable instruments of compact size and light weight; the elimination thereby of the need for complicated pumps, valves or conduit systems. These and other advantages will occur to those skilled in the art as the description proceeds.

As required by the patent laws, I have fully and carefully set forth practical embodiments of apparatus suitable for practicing the invention and I have described same so that the advance in the arts and science to which same appertains will be readily appreciated.

In the drawings:

Fig. 1 is a median sectional view of a dew-point measuring device constructed in accordance with my invention taken generally along the line 1—1 of Fig. 3 and in the indicated direction, and having portions in elevation.

Fig. 2 is a sectional view taken through the device along the line 2—2 of Fig. 3 and in the indicated direction.

Fig. 3 is a top plan view of the device.

Fig. 4 is a fragmentary sectional view taken through a portion of device and showing constructional details of the temperature measuring apparatus and cooling apparatus thereof.

Fig. 4 is a fragmentary sectional view taken through a portion of device and showing constructional details of the temperature measuring apparatus and cooling apparatus thereof.

Fig. 5 is a perspective view of a mirror or moisture collector showing the appearance of the surface thereof with no condensate formed thereon.

Fig. 6 is a perspective view of a mirror or moisture collector constructed in accordance with my invention and showing the appearance of the surface thereof with condensate formed thereon.

Fig. 7 is a sectional view taken through the mirror of Fig. 6.

Figs. 8 to 11 inclusive are sectional views taken through modified forms of mirrors constructed in accordance with the principles of the invention.

Fig. 12 is a diagrammatic representation of a modified form of the invention.

Generally, the principle upon which my invention is operative is that of gradually cooling a moisture collector having a gas sample in contact therewith at constant pressure until the vapor in said sample forms a visible condensate, whereupon the observer notes directly the temperature at which such condensate was formed by a suitable temperature measuring device. An important feature of the invention is the provision in a device of this type of a novel moisture collector which permits the observer to detect the formation of the condensate almost the instant it is formed at the true dew-point with greater accuracy than heretofore possible. This is accomplished by reducing the temperature differential between true dew-point and the apparent temperature at which condensate is first observed. Another important feature of the invention lies in the novel practical embodiment of the device which includes means for permitting the said moisture collector easily, readily and rapidly to be removed from the device for cleaning same and then to be replaced so that successive determinations may be run without undue delay and with continued reliability.

Referring now to the drawings, there is shown a practical construction of a dew-point measuring device embodying the invention and designated generally by the reference character 20. Same comprises a casing or housing consisting of a block 22 and cover member 23. The block 22 is recessed to provide in effect a pair of chambers 24 and 25 therein. The chamber 24 is disposed in the lower part of the block and opens to the bottom surface 26 of the block. The upper end of the chamber 24 communicates with the second chamber 25 which is larger in size, said chamber 25 being open at its top end. The lower chamber 24 may be cylindrical while the upper chamber 25 may have a rectangular cross section. At the top end of chamber 24 there is an annular flange 27 integral with wall 28 of said chamber and of lesser diameter than the chamber whereby in effect to segregate the two said chambers. The bottom 29 of chamber 25 is adapted to support thereon the mirror or moisture collector designated generally 30.

Referring now to Fig. 1, the moisture collector 30 is arranged snugly to fit into the chamber 25 and hence will conform in configuration thereto. Since the chamber illustrated is substantially square in cross section, moisture collector 30 is also square.

The cover member 23 is intended to hold the mirror or moisture collector 30 in place upon the block 22, and preferably to have its upper surface 48 flush with that of the block. Accordingly, the upper recess 25 has opposed lateral extensions in the form of rectangular grooves 31 and 32 to accommodate said cover member 23. The cover member 23 thus has a central rectangular portion and opposed extensions 36 and 37 engaged in the grooves 31 and 32 respectively. It is noted that the thickness of the member 23 is uniform throughout, but that the rectangular chamber 25 is slightly deeper than the extensions 31 and 32 by the thickness of the moisture collector 30 to form the recess 29 so that the cover member 23 will lock the collector 30 in place. A finger engaging space 33 may be formed in the bottom of groove 32 to assist in removal of the collector 30.

When the cover member 23 is in place, the extensions 36 and 37 are sandwiched between ends of the block on opposite sides of the receiving grooves. In other words, the groove 31 forms portions 38 on the left hand end of the block 22 as viewed in Fig. 3, while groove 32 forms portions 39. The end portion 36 of the cover member 23 is hingedly secured to the block by a shaft 35 journalled in portions 38 and passing through the extension 36. The free end 41 of extension 36 is rounded to permit the entire cover member 23 freely to be pivoted about the shaft 35 in a counter-clockwise direction from the position of member 23 shown in Fig. 1. The groove 31 has a concave transverse shallow depression 46 to seat and guide the rounded end 41.

The end 41 has a pair of circumferentially spaced grooves or sockets 42 and 43 adapted alternately to be engaged by the spring-pressed ball detent mechanism 44 disposed in cavity 45 provided in block 22. The cover member 23 can thus be moved to and locked in either open or closed position, depending upon whether ball detent mechanism 44 engages socket 42 or 43. In Figs. 1 to 3, the closed position is illustrated. The pressure of the detent mechanism may be adjusted by means of the screw plug 45'.

The cover member 23, has a central bore 47 therethrough to form the sample chamber 25' and to enable the mirror 30 to be observed. The chamber 25 is otherwise occupied by the central part of member 23 when in closed position. To the top 48 of member 23 is removably secured an escutcheon plate 49 by means of fastening screws 50, said plate 49 being adapted to retain a transparent plate 51 for sealing off the chamber 25' and permitting sight thereinto.

The extension 37 is made of sufficient length to provide a finger engaging lip 52 extending beyond the block 22. The lip 52 permits the observer to raise and lower the cover member 23 with ease and facility.

For purposes of illustration, the bore 47 defines the sample chamber 25' through which the gas sample is passed. The mirror 30 closes off the bottom of the chamber and the top thereof is closed off by means of the cover member 23 and plate 51. The sample chamber 25' has an inlet port 53 on the right in Fig. 2 and an outlet port 54 on the left. These ports have inlet and outlet conduits 55 and 56 respectively connected therewith, and it is intended that the sample gas be conducted into the sample chamber 25' through the port 53 and released through port 54. Referring to Fig. 2, passageway 57 is provided in member 23 to coincide with the inlet port 53 and a second passageway is provided therein to coincide with outlet port 54. The conduits connect with suitably aligned passageways 57' and 58' formed in the block 22.

Secured to the bottom 26 of the block 22 is the cooling mechanism of my device. Same comprises a simple expansion valve or jet which expands carbon dioxide or other gas refrigerant to lower the temperature of the mirror 30. The inlet tube 60 of relatively large diameter leads the gas from a tank or other source to the fitting 61 to which it is secured by a compression coupling of any suitable construction. For instance, the coupling may comprise the gland nut 62 screwed into the fitting 61 and having a malleable gland member 63. The fitting 61 has an annular flange 64 having a reduced portion 65 formed on the upper portion thereof of a diameter sufficient to be received in the chamber 24. The fitting is secured to the block 22 by means of fastening members 66 secured through flange 64 into the bottom of the block, said flange serving to close off the bottom of chamber 24.

A fine tube or capillary 67 leads from the end of the inlet tube 60 through fitting 61 to the top of chamber 24. Supported over the upper end 68 of the tube 67 is a cap member 70. The cap member consists of a housing having a central chamber 71 closed at its top end by means of the wall 72. The wall 72 is imperforate and its outside surface is adapted to be disposed against the mirror 30. There are a pair of spaced annular flanges 73, 73' formed on the lower end of the cap adapted to receive therebetween an insulating plate 74. The plate 74 is movably supported on the inside of chamber 24, and same preferably is made from fibre or other suitable insulating material so as to prevent conduction of heat to and from the cap 70. The plate 74 supports and centers cap 70. The efflux from the end 68 of tube 67 will impinge against the cap 70 thereby constituting the upper end 68 the expansion valve of a refrigerating system by permitting the rapid expansion of the gas leaving said end 68 after having been compressed upon entering the lower end of tube 67, all according to well known physical principles. A conduit 75 comprising an outlet for the expanded refrigerant is secured to the side wall of the block 22 and communicates with a passageway 76 in said side. The opposite end of passageway 76 communicates with the chamber 24 permitting removal of the refrigerant therethrough.

It will be appreciated that the cooling system hereinabove described is not exclusive and that any similar cooling system would be suitable. Thus, same could comprise a brine solution, or a coil carrying coolant or other well known means without departing from the spirit of the invention.

The cap 70 in effect is a concentrated source of cooling for the mirror 30 and hence should be in close proximity thereto and should be made of a good conductive material, such as copper or silver. In order to maintain close contact between the upper surface of the cap 70 and the mirror 30. I provide a tension member comprising a coil spring 77 disposed around the tube 67. The upper end of the spring 77 is disposed against the plate 74 while its lower end is disposed against the portion 65, said spring being arranged normally to bias the plate 74 and hence the cap 70 upward against the mirror 30 to maintain same in proper contact therewith. Upward movement of the plate 74 will be limited by engagement thereof with flange 27.

The temperature measuring device of my invention has been shown as a thermocouple 78 for use with a suitable galvanometer system. The wires 79 and 80 thereof are led through the side of the member 23 as shown at 81 into the sample chamber 25' and supported therein by a plug 82 of insulating material. The plug 82 is secured to one end 83 of a leaf spring 84, the opposite end 85 of said spring being secured in the side wall of chamber 47 of said cover member 23. Said spring 84 is designed to bias the juncture 87 of the wires 79 and 80 into constant contact with the mirror 30 when the cover member 23 is closed on the block 22. Obviously, it will be necessary for the condensate formed in chamber 25' to be deposited on the mirror 30 in the vicinity of the juncture's point of contact with said mirror in order to obtain an accurate temperature measurement. It will be seen that the cooling effect of the expansion valve 68 is concentrated by the cap end 72 to define a cold spot which will be easily seen. The spring 77 presses the cap 72 against the bottom of the collector 30 and also serves to raise the collector member 30 a small amount when the cover member 23 is pivoted to open condition. This facilitates removal of collector 30.

The principle of operation of the device herein described requires the effect of the cooling by the refrigerant in the chamber 25 to be felt by the target or mirror 30, so as to cool said mirror. The gas sample in contact with the mirror thereby also will be cooled until the dew-point of the sample is reached whereupon condensate will be deposited upon the mirror 30 in the vicinity of contact of the juncture 87 with the mirror. The observer watches through the plate 51 to detect the first formation of condensate on the mirror and at the instant of detection a reading of the galvanometer is taken to determine the dew-point temperature directly.

I have found that the mirror or targets heretofore used in apparatus, operative in accordance with this general principle give rise to delay in detection of the visible condensate. As heretofore discussed same may be due to the great amount of reflection of light from the surface thereof and/or supersaturation in the gas sample, since the cooling thereof takes place undisturbed in the chamber 47 whereby no "seeding" takes place to hasten formation of condensate at the dew-point. In this respect, mirrors heretofore used have very smooth surfaces thereby presenting no points or "seeds" around which condensation may be hastened. The mirror 30 hereinafter described is designed to eliminate errors in determination of dew-point which may be due to the above mentioned factors.

To this end, I have provided my mirror 30 with a roughened surface which may have minute troughs and peaks along at least a portion of the upper surface thereof. Referring to Fig. 7, there is shown in enlarged detail such troughs and peaks designated 90 and 91 respectively. The peaks serve as pin points around which droplets of condensate may form, and may be compared to "seeding" of the gas sample so as to prevent the phenomena of supersaturation. The troughs serve as reservoirs for the condensate formed at the dew-point, so that the condensate is, seen, as a result, as a dark spot such as shown at 92 in Fig. 6. The observer thereby is enabled more instantaneously to observe the formation of the visible condensate as distinguished from the appearance of heretofore known mirrors at this point as shown in Fig. 6.

The phenomena of the dark spot 92 being observed at the dew-point is believed to be due to the collection of condensate in the troughs which I provide on my mirror 30. Instead of the light rays being indiscriminately reflected from the surface of the mirror, those rays incident upon the condensate are transmitted more or less rectilinearly through the collector 30 whereby to make same more transparent or translucent so as to reveal the rear surface, which is observed as a dark spot 92. To emphasize the contrast between the roughened portion 93 of the moisture collector 30 and the moisture spot 92, I coat the back of the collector (in the case of a transparent collector such as glass or plastic) with a dark substance, such as black lacquer, paint, metal deposit, or the like, as indicated at 95.

It is particularly desirable in the operation of my device to have as good conduction as possible between the cap 70 and the mirror 30. To obtain such conduction, metal to metal contact between the cap and mirror may give good results. Accordingly, I may utilize the ordinary glass mirror which first has had its underside coated with a metallic pigment or coat of metal, this embodiment being shown in Fig. 11. The upper surface thereof is roughened or frosted as by minute scratches, sand-blasting or etching.

The metallic pigment or coat of metal deposited on the underside permits excellent conduction between the mirror 30 and cap 70, and also serves as a contrasting background for the spot 92 when same becomes visible.

In Fig. 8, there is shown a modified form of moisture collector adapted for obtaining the results of my device. The body of the mirror is made of metal and a deposit of transparent plastic material is deposited thereover. The upper surface of the plastic is then roughened or etched to provide the troughs and peaks necessary. The great advantage of such a construction is that the cooling effect passes very quickly through the metal body, especially when compared with the speed at which heat is transmitted through plastic or glass bodies. Another important advantage is that the temperature at the surface will be very close to the temperature of the metal body, and hence the temperature measuring thermocouple may be welded directly to the metal body at the position where the dark spot will form.

In Fig. 9 a modified form of collector is shown consisting of a clear, transparent plastic material whose upper surface has been provided with troughs and peaks and whose underside is coated with a pigment or metal deposit.

In Fig. 10, still another embodiment for the collector consists of a metal member on whose upper surface has been deposited a mono-molecular layer of some inert crystalline material such as crystalline quartz having the minute troughs and peaks therein. The spot will appear in contrast to the frosted appearance of the surface.

In all of the embodiments shown in Figs. 8 through 11, the dark spot formation is obtained at the dew-point. The observer thereby is enabled to note the temperature almost at the instant the condensate is deposited on the collector 30 and thereby determine accurately and reliably the true dew-point.

Instead of utilizing the observer's perception powers for noting the formation of the dark spot at the dew-point, it is contemplated that a light sensitive system also could be utilized. This is shown in Fig. 12. It would be feasible to employ a source of light 100 which would direct light rays 101 at the point on the target 102 where the condensate is formed and a cell 103 disposed to receive the light reflected from the mirror to be energized thereby. The current generated could then be passed through a suitable amplifier 104 to a suitable detection instrument 105. The scattered light 106 dispersed from the collector 102 would result in one reading of the instrument and when concentrated light 107 is reflected from the condensate collected in the troughs on the surface of the collector a different reading would result. In this manner the instant the condensate is formed could be noted on the detection instrument 105 and the temperature reading taken by some means such as thermocouple 110 and its detector 111 so as to give accurate and reliable dew-point determinations.

Other features of the invention to be noted are the ease and rapidity with which the mirror or collector 30 may be removed from the chamber 25; means provided for keeping the juncture 87 in contact with the mirror 30; and the means for maintaining the cooling element, namely the cap 70 in constant contact with the underside of the mirror 30.

The method employed with the apparatus for determining dew-point of a gas sample is admirably suitable for quick, repeated and reliable determinations. The gas is led into the chamber 25' where it is cooled by means of the cooled mirror until the dew-point is reached. The observer watches to detect the formation of the dark spot on the mirror 30 constructed in accordance with the invention whereupon he notes directly the temperature reading by means of the thermocouple and galvanometer system. It will be appreciated that since other physical properties of the gas in the chamber 25' may be known, it is possible also to determine the vapor pressure of gas sample in the chamber by means of my device and method.

It is felt that no additional description of the invention is required in order to attain an understanding thereof. The invention is admirably suited for use with recording instruments and detections instruments of great variety. It is particularly suited to the running of determinations of such gas samples as oil vapor and other hydrocarbon compounds.

It is also manifest that various modifications may occur to those skilled in the art without departing from the scope of the invention as defined in the claims appended hereto.

I claim:

1. A dew-point measuring device which comprises a housing having a gas sample chamber therein, means for leading a gas sample into the chamber, a moisture collector closing off the bottom of the chamber, means for cooling said collector whereby to lower the temperature of said sample, and means for measuring the temperature of condensate formed on said collector when the dew-point of the gas is reached, the surface of said collector being roughened so as to render said surface light-diffusing in character whereby condensate deposited upon an area of said surface will present a changed appearance as contrasted with the dry surface by reason of the elimination of said light-diffusing character.

2. A device as described in claim 1 in which said cooling means includes a cap member of heat conductive material spring biased into contact with the underside of said collector whereby to provide a concentrated source of cooling along the area of contact with the collector.

3. A dew-point measuring device which comprises a housing having a gas sample chamber therein, means for leading a gas sample into the chamber, a moisture collector closing off the bottom of the chamber, means for cooling said collector whereby to lower the temperature of said sample, and means for measuring the temperature of condensate formed on said collector when the dew-point of the gas is reached, said collector having a surface of a light-diffusing character whereby condensate deposited upon an area of said surface will present a darker appearance as contrasted with the dry surface by reason of the elimination of said light-diffusing character, and microscopic projections to seed cooled gas impinging against said collector to prevent supersaturation therein.

4. A dew-point measuring device which comprises a housing having a gas sample chamber therein, means for leading a gas sample into the chamber, a moisture collector closing off the bottom of the chamber, means for cooling said collector whereby to lower the temperature of said sample, and means for measuring the temperature of condensate formed on said collector when the dew-point of the gas is reached, said collector having a surface of a light-diffusing character whereby condensate deposited upon an area of said surface will present a darker appearance as contrasted with the dry surface by reason of the elimination of said light-diffusing character, said cooling means including a spring biased metallic element disposed against said collector for conducting heat therefrom and adapted to concentrate the cooling effect thereof along its area of contact with said collector.

5. A dew-point measuring device which comprises a housing having a gas sample chamber therein, means for leading a gas sample into the chamber, a moisture collector closing off the bottom of the chamber, means for cooling said collector whereby to lower the temperature of said sample, and means for measuring the temperature of condensate formed on said collector when the dew-point of the gas is reached, said collector having a surface of a light-diffusing character whereby condensate deposited upon an area of said surface will present a darker appearance as contrasted with the dry surface by reason of the elimination of said light-diffusing character, said cooling means including a spring biased metallic element disposed against said collector for conducting heat therefrom and adapted to concentrate the cooling effect thereof along its area of contact with said collector, comprising a cap member having an imperforate surface juxtaposed the underside of said collector.

6. A dew-point measuring device which comprises a housing having a gas sample chamber therein, means for leading a gas sample into the chamber, a moisture collector closing off the bottom of the chamber, means for cooling said collector whereby to lower the temperature of said sample, and means for measuring the temperature of condensate formed on said collector when the dew-point of the gas is reached, said collector having a surface of a light-diffusing character whereby condensate deposited upon an area of said surface will present a darker appearance as contrasted with the dry surface by reason of the elimination of said light-diffusing character, said housing comprising a block having an upper and lower chamber therein, and a cover member having a central bore therethrough adapted to coincide with said upper chamber when the cover member is closed on said block, said bore and upper chamber forming said gas sample chamber.

7. A dew-point measuring device which comprises a housing having a gas sample chamber therein, means for leading a gas sample into the chamber, a moisture collector closing off the bottom of the chamber, means for cooling said collector whereby to lower the temperature of said sample, and means for measuring the temperature of condensate formed on said collector when the dew-point of the gas is reached, said collector having a surface of a light-diffusing character whereby condensate deposited upon an area of said surface will present a darker appearance as contrasted with the dry surface by reason of the elimination of said light-diffusing character, said housing comprising a block having an upper and lower chamber therein, and a cover member having a central bore therethrough adapted to coincide with said upper chamber when the cover member is closed on said block, said bore and upper chamber forming said gas sample chamber, said cover member having a transparent plate mounted over one end of the bore closing same off and permitting sight into said sample chamber for the observation of the condensate.

8. A dew-point measuring device which comprises a housing having a gas sample chamber therein, means for leading a gas sample into the chamber, a moisture collector closing off the bottom of the chamber, means for cooling said collector whereby to lower the temperature of said sample, and means for measuring the temperature of condensate formed on said collector when the dew-point of the gas is reached, said collector having a surface of a light-diffusing character whereby condensate deposited upon an area of said surface will present a darker appearance as contrasted with the dry surface by reason of the elimination of said light-diffusing character, said housing comprising a block having an upper and lower chamber therein, and a cover member having a central bore therethrough adapted to coincide with said upper chamber when the cover member is closed on said block, said bore and upper chamber forming said gas sample chamber, said cover member having a transparent plate mounted over one end of the bore closing same off and permitting sight into said sample chamber for the observation of the condensate, said block having a detent mechanism adapted to engage said cover member for locking same in either an open or closed position on said block.

9. A dew-point measuring device which comprises a housing having a gas sample chamber therein, means for leading a gas sample into the chamber, a moisture collector closing off the bottom of the chamber, means for cooling said collector whereby to lower the temperature of said sample, and means for measuring the temperature of condensate formed on said collector when the dew-point of the gas is reached, said collector having a roughened surface of a light-diffusing character whereby condensate deposited upon an area of said surface will present a changed appearance as contrasted with the dry surface by reason of the elimination of said light-diffusing character, said temperature measuring means comprising a thermocouple juncture contacting said collector.

10. A dew-point measuring device which comprises a housing having a gas sample chamber therein, means for leading a gas sample into the chamber, a moisture collector closing off the bottom of the chamber, a cover member closing off the top of the chamber, means for cooling said collector whereby to lower the temperature of said sample, and means for measuring the temperature of condensate formed on said collector when the dew-point of the gas is reached, said collector having a surface of a light-diffusing character whereby condensate deposited upon an area of said surface will present a changed appearance as contrasted with the dry surface by reason of the elimination of said light-diffusing character, said temperature measuring means comprising a thermocouple juncture contacting said collector, and including an insulating plug supporting said juncture and a spring member secured between the cover member and said plug for biasing said juncture into constant contact with said collector when the cover member is closed.

11. A dew-point measuring device which comprises a housing having a gas sample chamber therein, means for leading a gas sample into the chamber, a moisture collector closing off the bottom of the chamber, means for cooling said collector whereby to lower the temperature of said sample, and means for measuring the temperature of condensate formed on said collector when the dew-point of the gas is reached, said collector having a surface of a light diffusing character whereby condensate deposited upon an area of said surface will present a darker appearance as contrasted with the dry surface by reason of the elimination of said light-diffusing character, said surface having roughening for providing said character including troughs for collecting the condensate therein to counteract the light-diffusing effect of the surface.

12. A device as described in claim 11 in which the collector comprises a glass plate having a metallic coating on the underside thereof.

13. A device as described in claim 11 in which the collector comprises a glass plate having a coating of dark pigment on the underside thereof.

14. A device as described in claim 11 in which the collector comprises a metallic plate having a layer of transparent plastic material on the upper surface thereof.

15. A device as described in claim 11 in which the collector comprises a plate of transparent plastic material having a layer of metal on the underside thereof.

16. A device as described in claim 11 in which the collector comprises a metallic plate having a layer of crystalline quartz on the upper surface thereof.

17. A device for measuring the dew point of a gas and which operates by virtue of the deposition of condensate of said gas upon a moisture collecting surface for observation of the condensate, said device having a chamber arranged to receive a sample of the gas therein, a planar moisture collector in said chamber providing said surface and means for cooling a limited area of said collector, said collector having means rendering the said surface strongly light-scattering in character whereby the area upon which condensate is deposited will present a contrasting appearance compared to the dry area of said surface.

18. A device as described in claim 17 in which said cooling means includes an imperforate member of heat conductive material in contact with said collector for effecting a concentrated cooling source for said limited area of the collector.

19. A device for measuring the dew point of a gas and which operates by virtue of the deposition of condensate of said gas upon a moisture collecting surface for observation of the condensate, said device having a chamber arranged to receive a sample of the gas therein and a planar moisture collector in said chamber providing said surface, means for cooling a limited area for said collector, said surface being roughened so as to render the same light-scattering in character whereby the area upon which the condensate is deposited will present a contrasting appearance compared to the dry area of said surface, and including troughs for catching said condensate to counteract the scattering effect of the roughening and microscopic projections to seed cooled vapor impinging against said collector to prevent supersaturation therein.

20. A device of the character described in claim 19 in which said collector is translucent and has on its rear surface a coating of a color contrasting with that of the dry surface of said collector.

21. A device of the character described in claim 19 in which said collector is translucent and has a dark pigment coating on its rear surface.

22. A device of the character described in claim 19 in which said collector is made of metal having said roughening on a surface thereof.

23. A device of the character described in claim 19 in which said collector surface has an extremely thin crystalline coating of a water inert material.

24. A device of the character described in claim 19 in which said collector is made of metal and the collector surface has an extremely thin coating of a water inert material comprising crystalline quartz.

25. A device of the character described in claim 19 in which said collector is made of metal and said collector surface comprising a thin coating of normally translucent material having said roughening thereon.

26. A device of the character described in claim 19 in which said collector is translucent and has a coating of metal on its underside.

References Cited in the file of this patent

UNITED STATES PATENTS

| Number | Name | Date |
|---|---|---|
| 1,470,720 | Garren | Oct. 16, 1923 |
| 1,883,116 | Tomlinson | Oct. 18, 1932 |
| 2,281,418 | Deaton et al. | Apr. 28, 1942 |
| 2,303,154 | Armstrong | Nov. 24, 1942 |
| 2,376,209 | Turin | May 15, 1945 |